March 28, 1950     O. W. HUETER     2,501,942
SUCTION CUP PLACEMENT
Filed Aug. 11, 1948
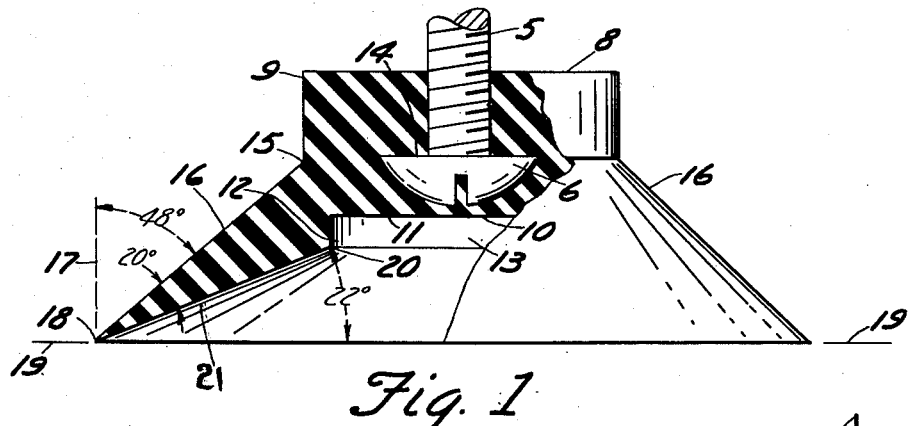
Fig. 1
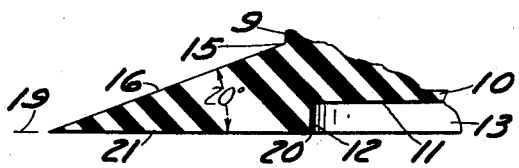
Fig. 2
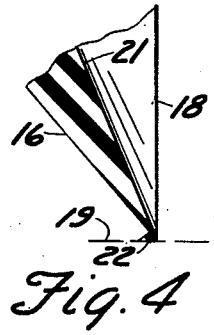
Fig. 4
Fig. 3
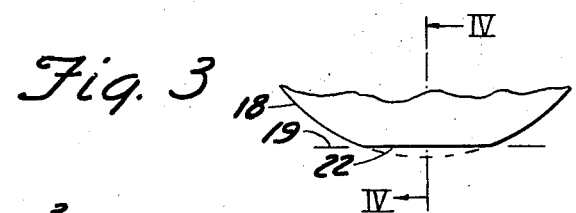
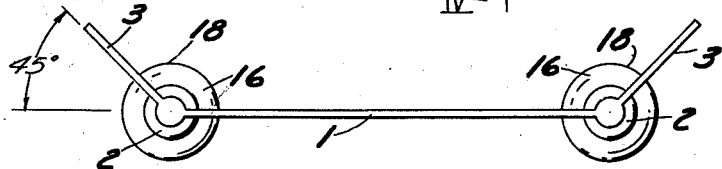
Fig. 5
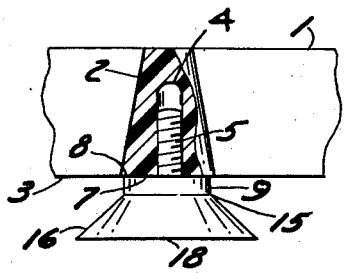
Fig. 6
Inventor
Otto W. Hueter
By
Attorney Patented Mar. 28, 1950

2,501,942

UNITED STATES PATENT OFFICE 2,501,942

SUCTION CUP PLACEMENT

Otto W. Hueter, Toledo, Ohio

Application August 11, 1948, Serial No. 43,725

1 Claim. (Cl. 248—362)

This invention relates to special developments for accurate placement of objects in anchorage to a smooth surface, independently of detracting from the finish of such surface.

This invention has utility when incorporated in suction cup means wherein the circumferential lip of contact is sufficiently yielding and of retained elasticity, for the fully open position for the cup to respond upon thrusting to closed position fully to conform to an area face inward therefrom at contact flattening, wherein the departure from normal inactive configuration is so efficiently stabilized by differential pressure to provide maintenance of reliable holding means for such time intervals as to promote acceptable wide ranges for use.

Referring to the drawings:

Fig. 1 is a side elevation, partly broken away, and upon a considerably enlarged scale of an embodiment having 1⅜" diameter as normal or in non-anchoring condition;

Fig. 2 is a fragment, in section, of the suction cup rim (Fig. 1) in conforming to flat surface placement therefor;

Fig. 3 is an on-edge view looking side-wise or toward the cup bottom as its ¼ oz. weight folds back the readily yieldable lip edge in the range of 30°;

Fig. 4 is a section on the line IV—IV, Fig. 3, showing the soft cup lip rim readily lying flat on the support therefor;

Fig. 5 is a plan view of an embodiment of a plurality of the suction cups of Fig. 1 in a fender, rack or guard; and Fig. 6 is a fragmentary view showing the cup anchorage or mounting in the plastic guard.

In solid, mottled or wide range of selected colors, as opaque or translucent to transparent, a plastic unit bar portion or slat 1 is provided with downwardly open enlargements or lugs 2 with angularly deflected end wings 3 therefrom. Openings 4 in the lugs 2 are internally threaded to be engaged by stems 5 as externally threaded and extending from round heads 6.

A flat base 7 of the lugs 2 is engaged by a flat seat 8 of a cylindrical body portion 9. Molded or formed in the plastic body 9 and centrally to protrude therefrom as to the stem 5 is the screw 5, 6, with a thin portion 10 of the body concealing the tip of the rounded head 6 from the bottom 11 of a cup having a cylindrical bounding wall portion 12 in forming a shallow cup 13 of about 20% less internal diameter than the external diameter of the body 9.

Approximately in a plane of flat side 14 of the screw head 6 is junction line 15 between the body 9 and outwardly and inclined or straight taper face 16, herein shown as approximately 48° away from a perpendicular 17 to a plane of a cup rim or edge 18 adapted peripherally to contact a flat face 19, or even conform to a more or less smooth concave or convex face.

The cup wall portion 12 has a corner 20 from which a flare conical straight face 21 extends to the cup lip or edge 18. As away from the flat face 19 or the plane for the edge 18 as in normal or idle position, the angle for the face 21 is in the range of 22°. This leaves the spread between the faces 16, 21, as about 20° in the diverging of the straight face cone portions from a soft edge 18.

In the practice hereunder, the suction cup body or integral unit as mold-anchored with the screw 5, 6, is of rubber or like elastic material, readily distorted as away from the body 9, but sensitive to return to initial normal shape. Considering the diameter of the suction cup unit as 1⅜", and the screw 3/16" diameter by ½" long, the total mass is about ¼ oz. Resting on an edge of the lip 18, it has a flattened out portion 22 (Figs. 3, 4) as much as 30° in its peripheral extent. When the cup be dry and dropping of its own weight as little as 3" to land flat on the rim edge 18, there is an anchoring of as much as over 1#. A pressure of around 3# on the stem 5 flattens the entire face 21 for overall slightly increased diameter.

The unit performs as a sensitive check valve. The outer face 16 of the cup flare is a more steep cone section having a common axis with the face 21. These cones are considered as nested for face intersection at the edge 18, thus defined as in a plane perpendicular to the common axis of the two cones as central of the stem 5.

The straight faces 16, 21, from the edge 18, provide a resilient or yieldable rubber-like body normally tending to hold initial shape, but pressure-responsive to deformation. However, as the distortion action be relieved, there is immediate return to initial normal configuration. The converging of the faces 16, 21, is in a straight taper to the endless rim 18. This convergence, in the softness of the edge 18 has it of feather-like characteristic in adapting it for ready snug seating at the region, plane or face with which the cup is to effect placement for the object to be held, as the guard 1, 2, 3. It is thus seen that the face 16 fares out to knife-edge like margin or rim edge 18 with the face 21. The volume or capacity of the defined cup 13 is relatively small as to the volume of the undeformed flare. The thin region 10 at the screw head is a positive bonding against disturbance. The flattening of the side 21 (Fig. 2), while increasing the periphery, actually to an extent reduces the spacing between the edge 18 and the corner 20. This is interpreted to mean that the body toward the face 16 undergoes slightly less radial extension or stretch, as somewhat localized for source as from the region of the corner 15 and screw top face 14. Upon press-seating or anchoring of the cup-unit, air volume from the flare is expelled at the rim 18. This rim is so thin at its face 16, that the face 21 has insured snug fit, dispersed over the area therefrom to the cup 13 in such a predominant degree as to stabilize this distortion of the tension force factor in the region of the face 21 as opposed to the but slightly diverging compression force in the region of the face 16, especially from rim moistening. The predominant degree as herein disclosed, taking the slant radial width of the face 21 between the corners 18, 20, as approximately twice the radius of the cup region 13, approaches between seven and eight times in area for the maximum contact as fully effective between the corners 18, 20, than the area inward from the corner 20.

What is claimed and it is desired to secure by Letters Patent is:

A suction cup of elastic material body having a re-entrant cup-mounting side with a central relatively shallow cup region bounded by an annular shoulder, said body having two outward conical taper faces meeting at a feather edge rim concentric with and spaced outwardly from the annular shoulder, there being an angle between said faces not more than in the range of twenty degrees, with the angle between the inner face and the plane of the feather edge at the out-of-use position for the cup being not more than in the range of twenty-two degrees, whereby there is established sufficient between-conical-faces thinness in the elastic material body for the feather edge to approach co-planar relation as to said shoulder in cup holding position.

OTTO W. HUETER.

REFERENCES CITED

The following references are of record in the file of this patent:

UNITED STATES PATENTS

| Number | Name | Date |
|---|---|---|
| 1,799,445 | Stansberry | Apr. 7, 1931 |
| 1,877,570 | FitzGerald | Sept. 13, 1932 |
| 1,902,322 | David | Mar. 21, 1933 |
| 2,314,803 | Wagner et al. | Mar. 23, 1943 |
| 2,432,719 | Braun | Dec. 16, 1947 |